United States Patent [19]

Ryoke et al.

[11] Patent Number: 4,649,072
[45] Date of Patent: Mar. 10, 1987

[54] MAGNETIC RECORDING MEDIUM

[75] Inventors: Katsumi Ryoke; Nobutaka Yamaguchi; Masatoshi Takahashi; Kazuko Hanai; Hideaki Kosha; Eiichi Tadokoro, all of Kanagawa, Japan

[73] Assignee: Fuji Photo Film Co., Ltd., Kanagawa, Japan

[21] Appl. No.: 779,348

[22] Filed: Sep. 23, 1985

[30] Foreign Application Priority Data

Sep. 21, 1984 [JP] Japan ................................ 59-196567
Oct. 12, 1984 [JP] Japan ................................ 59-212602

[51] Int. Cl.$^4$ ............................ G11B 5/68; G11B 5/78
[52] U.S. Cl. ............................ 428/212; 427/131; 428/323; 428/408; 428/423.1; 428/694; 428/695; 428/900
[58] Field of Search ............... 428/694, 900, 408, 323, 428/212; 427/131; 360/134, 131

[56] References Cited

U.S. PATENT DOCUMENTS

| | | | |
|---|---|---|---|
| 4,452,863 | 6/1984 | Takizawa et al. | 428/694 |
| 4,474,843 | 10/1984 | Miyoshi et al. | 427/131 |
| 4,539,257 | 9/1985 | Ryoke et al. | 427/131 |
| 4,544,601 | 10/1985 | Yamaguchi et al. | 427/131 |
| 4,551,386 | 11/1985 | Yamaguchi et al. | 427/128 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a non-magnetic support having provided thereon a magnetic layer on one side and a backing layer on the other side, wherein the backing layer contains (1) non-magnetic powders containing carbon black having an average particle diameter of from 0.1 to 1 μm; (2) two or more binders wherein (a) at least one of the binders is a resin having a 100% modulus of from 15 to 150 kg/cm$^2$ in an amount of from 50 to 95 wt % based on the total amount of the binders in the backing layer, and (b) the rest binder(s) is/are a resin other than the resin having a 100% modulus of from 15 to 150 kg/cm$^2$, and the weight ratio of all the non-magnetic powders to all the binders in the backing layer is from 300:100 to 40:100; and (3) a polyisocyanate in an amount of from 15 to 40 wt % based on the total amount of the binders in the backing layer.

22 Claims, No Drawings

MAGNETIC RECORDING MEDIUM

FIELD OF THE INVENTION

The present invention relates to a magnetic recording medium and more particularly, to a magnetic recording medium comprising a non-magnetic support sandwiched between a magnetic recording layer (hereinafter "magnetic layer") and a back layer, which are composed so as to exhibit high sensitivity.

BACKGROUND OF THE INVENTION

In recent years, high sensitization has been required for magnetic recording because it improves image and sound qualities and permits high density recording thereof. This high sensitization can be realized by improving a deck for reproduction and recording of magnetic records, a magnetic recording system of a magnetic recording medium, and also by improving the magnetic recording medium itself and so forth.

The high sensitization through improvement of the magnetic recording medium can be attained by increasing the signal part of the signal/noise ratio or by decreasing the noise part thereof. Increasing the signal part of the signal/noise ratio can be accomplished by decreasing the size of ferromagnetic particles in the magnetic layer, or by controlling the anisotropy of shape and the arrangement of a monomagnetic zone in the ferromagnetic powder so that the residual magnetic flux density and the coercive force of the magnetic recording medium are increased.

In decreasing the noise part, various factors are involved, including the smoothness of the magnetic layer and the charging characteristics of the magnetic recording medium. In order to control the charging characteristics and to maintain running durability, it has been proposed that a backing layer is provided. Details of such backing layers are described in U.S. Pat. No. 4,135,031 and Japanese Patent Publication No. 3927/75, Japanese patent application (OPI) Nos. 111828/82 and 96505/77 (the term "OPI" as used herein means a "published unexamined Japanese patent application").

High sensitive magnetic recording media having good running durability are quite difficult to produce even by employing the methods described in the above references. The major reasons are as follows.

(1) If the surface of the magnetic recording medium is smoothed, the spacing loss between the magnetic recording medium and the head for reproduction and recording of magnetic records is decreased, but its running durability is reduced and, furthermore, its coefficient of friction is increased, causing problems such as the peeling off of the magnetic layer.

(2) If the surface of the backing layer is roughened to increase its running durability, the roughness in the surface of the backing layer is printed through the magnetic layer. This leads to a reduction in the RF output and the signal/noise ratio of the magnetic layer.

(3) Furthermore, even at the initial running stage where the peeling off of the magnetic layer or the back layer does not occur, the number of drop outs is increased and the signal/noise ratio is decreased.

(4) Calendering treatment is known as one of the techniques for smoothing the surface of the magnetic layer for the high sensitization thereof (see, for example, Japanese Patent Publication No. 10244/74). However, if a degree of smoothness of the magnetic layer achieves the required high sensitization, the backing layer is peeled apart and, therefore, the desired magnetic recording medium is difficult to produce.

SUMMARY OF THE INVENTION

An object of the present invention is to provide a novel backing layer with which the charging potential is controlled so as to provide a magnetic recording medium havign a reduced number of drop outs and having an excellent signal/noise ratio.

Another object of the present invention is to provide a magnetic recording medium with a backing layer having good running properties.

Still another object of the present invention is to provide a magnetic recording medium having good sensitivity, in which roughness in the surface of the backing layer does not affect the signal/noise ratio of the magnetic layer.

Yet another object of the present invention is to provide a magnetic recording medium in which the backing layer does not peel apart during the pressure molding or calendering treatment of the magnetic recording medium.

As a result of the extensive investigations by the present inventors, it has been found that the drop out occurring at the initial running stage and during repeated running is caused by adhesion of dust on the surface of the magnetic recording medium and scraps of the magnetic recording medium. In many cases, this dust adhesion is considered to be caused by the arrangement and the insulation or insulative properties of the running path of the magnetic recording and reproduction deck, and the running speed of the magnetic recording medium or tape. In the case of the magnetic recording medium, however, it is believed that charging properties, surface electric resistance, and so forth thereof cause the dust adhesion. In connection with the charging properties, not only the surface electric resistance of the magnetic recording medium but also the charging potential of the magnetic recording medium itself are important. In turn, the selection of a powder and a binder resin used in the magnetic recording medium controlling the above characteristics are important. In selection of the powder and the binder resin, it should also be taken into consideration that they must meet the requirement that the peeling-apart of the layers is prevented during the calendering treatment and so forth. Another important factor is the running circumstance; the charging properties of the dust and the influences of temperature and humidity thereon are very complicated and delicate. As a result of further investigations by the present inventors on the friction characteristics, a backing layer has been developed which does not cause a reduction in the signal/noise ratio of the magnetic layer even when printed through the magnetic layer.

The present invention is based on the above discovery and provides a magnetic recording medium comprising a non-magnetic support having provided thereon a magnetic layer on one side and a backing layer on the other side, wherein the backing layer contains (1) non-magnetic powders containing carbon black having an average particle diameter of from 0.1 to 1 $\mu$m; (2) two or more binders wherein (a) at least one of the binders is a resin having a 100% modulus of from 15 to 150 kg/cm$^2$ in an amount of from 50 to 95 wt% based on the total amount of the binders in the backing layer, and (b) the rest binder(s) is/are a resin other than the resin having a 100% modulus of from 15 to 150 kg/cm$^2$, and the weight ratio of all the non-magnetic powders to all the binders in the backing layer is from 300:100 to 40:100; and (3) a polyisocyanate in an amount of from 15 to 40 wt% based on the total amount of the binders in the backing layer.

DETAILED DESCRIPTION OF THE INVENTION

As the ferromagnetic fine powder used in the magnetic layer of the present invention, known ferromagnetic fine powders, such as $\gamma$-Fe$_2$O$_3$, Co-containing $\gamma$-Fe$_2$O$_3$, Fe$_3$O$_4$, Co-containing Fe$_3$O$_4$, CrO$_2$, Co-Ni-P alloy, Co-Ni-Fe alloy, etc., having a specific surface area as determined with the nitrogen absorption method (the B.E.T. method) of from 25 to 70 m$^2$/g, preferably from 27 to 70 m$^2$/g, and more preferably from 30 to 70 m$^2$/g can be used. By providing the magnetic layer containing a ferromagnetic fine powder having a specific surface area (as determined with the nitrogen absorption method) of from 27 to 70 m$^2$/g and the backing layer as described hereinafter, a magnetic recording medium having a particularly excellent RF output can be obtained.

Ferromagnetic fine powders or powders which can be used in the present invention are described in Japanese Patent Publications Nos. 14090/69, 18372/70, 22062/72, 22513/72, 28466/81, 38755/81, 4286/72, 12422/72, 17284/72, 18509/72, and 18573/72.

These ferromagnetic fine powders or powders, additives, and supports or a process for the production of magnetic recording media are described in U.S. Pat. No. 4,135,061.

The carbon black used in the backing layer of the present invention includes MT (medium thermal), FT (fine thermal) and furnal carbon corresponding to MT or FT as the classes in the trade of carbon blacks. Commercially available examples of the above carbon blacks include Asahi Thermal (produced by Asahi Carbon Co., Ltd.), HTC #20 (produced by Nittetsu Kagaku Co., Ltd.), Sebacarb MT (produced by Sevalco), Huber N 900 (produced by Huber), Raven MTP (produced by Columbian), Thermax P-33, etc. One of the features of these carbon blacks is that the specific surface area (as determined by the nitrogen absorption method) is 25 m$^2$/g or less, and another feature is that the structure thereof is not relatively developed. In the present invention, it is preferred to use the carbon black having a color transmittance in benzene (as determined by JIS-K-6221-1975) (Solvent Discoloration, %T, DIN 53553 (1976) Entwurf) of 50% or more.

This carbon black can be obtained by removing a tar-based coloring component from the above-described carbon blacks through treatment with organic solvents. One example of such carbon blacks which are commercially available is MTCI (a trade name, produced by Sevalco, Benzene color transmittance: 100% at 420 nm, Particle diameter: 350 m$\mu$, Nitrogen surface area: 6 m$^2$/g). The tar component affects the dispersion and migration with the binder. If the amount of the tar component is large, for example, in the case of Raven MTP having a benzene color transmittance of 4.4%, the plasticization phenomenon occurs, thereby preventing the formation of a tough film and, furthermore, the tar component itself prevents the binder from mixing with carbon black. Thus, crumbling of the backing layer in a powder form and an increase in drop out due to the crumbling are caused.

In intermingling the carbon black with the binder, excess dispersion force is needed. Usually this intermingling proceeds while the structure of the carbon black is broken. If the carbon black and binder are not sufficiently mixed, the crumbling may after the formation of the magnetic layer. However, in the case of MT, FT and FT-corresponding carbon black which have not formed the carbon black structure or in which the structure is insufficiently formed, such carbon blacks can be mixed efficiently with the binder and an increase in the surface electric resistance of the coated film with the progress of dispersion is not involved. These carbon blacks can provide the surface having suitable roughness and with use of the specific resin in the specific powder/binder ratio and the polyisocyanate as described hereinafter, good durability thereof can be obtained. The average particle diameter of the carbon black is preferably from 0.1 to 1 $\mu$m and more preferably from 0.15 to 0.5 $\mu$m.

As the binder to be used in the backing layer of the present invention, among known thermoplastic, thermosetting and reactive type resins, and mixtures thereof, those having a 100% modulus (as determined by JIS-K-6301) of from 15 to 150 kg/cm$^2$ are preferred, with those having a 100% modulus of from 15 to 120 kg/cm$^2$ being more preferred. These resins are used in the backing layer in an amount of from 50 to 90 wt% based on the total amount of the binders used therein. If the 100% modulus is larger than 150 kg/cm$^2$, the backing layer is disadvantageous in scratching and drop out.

Thermoplastic resins which can be used herein are those having a softening temperature of 150° C. or less, an average molecular weight of from about 10,000 to about 200,000, and a degree of polymerization of from about 200 to about 500. Specific examples, whuch are described in U.S. Pat. Nos. 4,367,261 and 4,388,360, include a vinyl chloride-vinyl acetate copolymer, a polyurethane resin, a phenoxy resin, an epoxy resin, a polyester resin, an acrylate ester-styrene copolymer, a methacrylate ester-acrylonitride copolymer, a methacrylate ester-styrene copolymer, a urethane elastomer, a nylon-silicone resin, a butadiene-acrylonitrile copolymer, a polyamide resin, polyvinyl butyral, cellulose derivatives (e.g., cellulose acetate butyrate, cellulose diacetate, cellulose triacetate and a cellulose propionate), a styrene-butadiene copolymer, a polyester resin, a chlorovinyl ether-acrylate ester copolymer, an amino resin, synthetic rubbers, and mixtures thereof. Preferably, a polyurethane resin is employed. Commercially available examples of the polyurethane resin include DN-4805 (100% modulus=50 kg/cm$^2$), DN-4806 (100% modulus=100 kg/cm$^2$), DN-4830 (100% modulus=120 kg/cm$^2$), N2302 (100% modulus=25–40 kg/cm$^2$), N-2304 (100% modulus=15–30 kg/cm$^2$), (all produced by Nippon Polyurethane Co., Ltd.) and the like.

In the present invention, as described above, it is necessary to add the resin having a 100% modulus of 150 kg/cm$^2$ or less in an amount of 50 to 95 wt%, in order to decrease the formation of scratches on the backing layer due to the presence of dust during its passage between the guide system and the backing layer. The reason why the formation of scratches of the backing layer can be prevented by using the above resin therein, is that such a resin can absorb the shock of the dust collision to the surface of the magnetic recording medium.

The backing layer must have good toughness also. Thus, in order to provide a well-balanced coating, in other words a coating having sufficient hardness and elongation, polyisocyanate, generally known as a hardening agent, having a high curing speed and by which the backing layer has a high stiffness is used. The amount of the polyisocyanate used herein is preferably from 15 to 40 wt%, more preferably 15 to 30 wt%, based on the total weight of the binders in the backing layer. If the amount of the polyisocyanate used is more than 40 wt%, the softness of the coated layer is lost. And if it is less than 15 wt%, the toughness of the coated layer is lost. These are especially disadvantageous in durability of the products.

Polyisocyanate which are used in the backing layer of the present invention include Desmodur L (reaction product of tolylenediisocyanate and trimethylolpropane, produced by Sumitomo Bayer Co., Ltd.), Coronate L (reaction product of tolylenediisocyanate and trimethylolpropane, produced by Nippon Polyurethane Co., Ltd.), Takenate D-102 (reaction product of tolylenediisocyanate and trimethylolpropane, produced by Takeda Chemical Industries, Ltd.), Desmodur TT (dimer of tolylenediisocyanate, produced by Sumitomo Bayer Co., Ltd.), and Takenate D-200 (dimer of tolylenediisocyanate, produced by Takeda Chemical Industries, Ltd.).

As resins other than the above resins which are used in the backing layer of the present invention in an amount of 50 wt% or less based on the binders in the backing layer, conventionally known thermoplastic resins, thermosetting resins, reactive resins, and mixtures thereof are used. These resins have a softening temperature of 150° C. or less, an average molecular weight of from 10,000 to 200,000, and a degree of polymerization of from about 200 to about 2,000.

Typical examples thereof include a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acryate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (e.g., cellulose acetate butyrate, cellulose diacetate, cellulose triacetate, cellulose propionate, and nitrocellulose), a styrene-butadiene copolymer, a p lyester resin, a chlorovinyl ether-acrylic acid ester copolymer, an amino resin, various synthetic rubber-like thermoplastic resins, and their mixtures. Preferably, a vinyl chloride resin, a vinyl acetate resin, a vinylidene chloride resin, an acrylonitrile resin and cellulose derivatives are used.

These resins are described in, for example, Japanese Patent Publications Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72.

Fine non-magnetic powders other than carbon black which can be used in the backing layer of the present invention include TiO, $TiO_2$, talc, $BaSO_4$, $CaCO_3$, graphite, $(CF)_n$, $(BN)_n$, $SiO_2$, $MoS_2$, ZnO, $\alpha$-$Fe_2O_3$, $Al_2(SiO_3)_2$, $Al_2O_3$, $CaSiO_3$, zeolite, $MgCO_3$, $BaCO_3$, $Cr_2O_3$, SiC, silicon nitride, zirconium silicate, $MgSiO_n$, a benzoguanamine resin, CsO, BeO, $(CB)_n$, $Mg(OH)_2$, etc. Of these compound, those having a low surface electric resistance by themselves or those which have their surface electric resistance lowered by application of surface treatment thereto are more preferred. Examples of the surface treatment are disclosed in *Nippon Setchaku Kyokai Shi* (Japanese Adhesion Soc.), 21(1), 24–31 (1985), *Hyomen* (Surface), 21, 33–43 (1983), Japanese Patent Publication No. 1048/1982 and the like. It is preferred for all the above fine powders to have an average particle size of about from 0.01 to 3 μm, preferably from 0.05 to 1.0 μm.

It is preferred that the non-magnetic powder as used herein contains at least 50 wt% of the above-mentioned carbon black based on the total amount of the non-magnetic powder and the ratio of the non-magnetic powder to the total binders in the backing layer is from 300:100 to 40:100, more preferably from 200:100 to 50:100 and especially preferably from 200:100 to 75:100. If the non-magnetic powder is in excess of the ratio 300:100, the adhesion of the backing layer to the non-magnetic support is reduced and, therefore, the drop out after repeated running is liable to increase. On the other hand, if it is less than the ratio 40:100, the surface electric resistance of the tape is not satisfactory, and the noise due to discharge between the tape and the deck head is observed as the drop out.

In the present invention, the backing layer may further contain various dispersing agents and lubricating agents.

Dispersing agents which can be used in the backing layer of the present invention include fatty acids having 12 to 18 carbon atoms, as represented by the formula $R_1COOH$ (wherein $R_1$ is an alkyl group having 11 to 17 carbon atoms), such as capric acid, caprylic acid, lauric acid, myristic acid, palmitic acid, stearic acid, oleic acid, elaidic acid, linolic acid, linolenic acid, and stearolic acid; metal soaps comprising the alkali metal (e.g., Li, Na, and K) or alkaline earth metal (Mg, Ca and Ba), Pb, Cu and the above fatty acids; lecithin; etc.

Lubricating agents which can be used in the backing layer of the present invention include graphite, molybdenum disulfide, tungsten disulfide, a fatty acid ester composed of a monobasic fatty acid having 12 to 16 carbon atoms and a monohydric alcohol having 3 to 12 carbon atoms, a fatty acid ester composed of a monobasic fatty acid having at least 17 carbon atoms and a monohydric alcohol where the total number of carbon atoms in the fatty acid ester is 21 to 23, silicones such as dimethylpolysiloxane and methylphenylsiloxane, and the like.

These dispersing agents and lubricating agent cannot be clearly distinguished from each other, since many compounds have the dispersing and lubricating properties.

Solvents which can be used in kneading and coating the composition for the backing layer of the present invention include ketones such as acetone, methyl ethyl ketone, methyl isobutyl ketone, and cyclohexanone; alcohols such as methanol, ethanol, propanol, and butanol; esters such as methyl acetate, ethyl acetate, butyl acetate, ethyl lactate, glycol acetate monoethyl ether; glycol ethers such as ether, glycol dimethyl ether, glycol monoethyl ether, and dioxane; tars or aromatic hydrocarbons such as benzene, toluene, and xylene; chlorinated hydrocarbons such as methylene chloride, ethylene chloride, carbon tetrachloride, chloroform, ethylenechlorohydrin, and dichlorobenzene; water; etc. These solvents can be used in mixture form thereof in any ratio.

In forming the magnetic recording layer or backing layer, the above ingredients are mixed in any desired combination, dispersed in an organic solvent, and coated on a support.

When the magnetic recording medium is used as a tape, the thickness of the support is from about 2.5 to about 100 μm and preferably from about 3 to about 40 μm. Materials which can be used as the support include polyesters such as polyethylene terephthalate and polyethylene, naphthalate; polyolefins such as polypropylene; cellulose derivatives such as cellulose triacetate and cellulose diacetate; vinyl resins such as polyvinyl chloride; other plastics such as polycarbonate; metals such as aluminum and copper; ceramics such as glass; etc. Preferably, polyethylene terephthalate is used.

The coating composition for the backing layer of the present invention can be prepared by treating the above ingredients to be dispersed e.g., a carbon black, a binder, a solvent, and a powder) in, for example, a ball mill, a pebble mill, a sand grinder, Szegvari Attritor, a three roll mill, a high-speed impellor dispersing device, and a high-speed stone mill.

The backing layer can be coated on the support by techniques such as air doctor coating, blade coating, air knife coating, squeeze coating, dip coating, reverse roll coating, transfer roll coating, gravure coating, kiss coating, cast coating, spray coating, and bar coating. In addition, other coating methods can be employed. The details of the coating methods are described in "*Coating Kogaku* (Coating Engineering)", Asakura Shoten (Tokyo), pp. 253–277 (Mar. 20, 1971).

The dry thickness of the backing layer is in the range of from 0.5 to 2.5 μm, preferably from 1.5 to 2.5 μm.

The present invention is described in greater detail with reference to the following Examples. It can be easily understood by one skilled in the art that the ingredients, ratio, operation order, etc. can be altered within the range not departing from the spirit and scope of the present invention. Thus the present invention is not limited to the Examples.

All parts are by weight in the Examples.

EXAMPLE 1

| | Amount (parts) |
|---|---|
| Co-Containing γ-Fe$_2$O$_3$ powder (specific surface area as determined by the nitrogen absorption method: 30 m$^2$/g; powder Hc: 600 Oe) | 300 |
| Vinyl chloride-vinyl acetate copolymer (Copolymerization composition: 86:13) ("VMCH" a trade name, manufactured by Union Carbide Co., Ltd.) | 30 |
| Polyurethane resin ("Nipporan N2304" a trade name, produced by Nippon Polyurethane Co., Ltd.) | 15 |
| Carbon black (average particle size: 17 mμ) | 20 |
| Lecithin | 3 |
| α-Alumina (average particle size: 0.7 μm) | 10 |
| Oleic acid | 5 |
| Octyl laurate | 3 |
| Lauric acid | 3 |
| Butyl acetate | 330 |
| Methyl ethyl ketone | 660 |

The above ingredients were placed into a ball mill and kneaded thoroughly. Then, 40 parts of Desmodur L-75 (a trade name of a polyisocyanate compound produced by Bayer AG) was added thereto and uniformly dispersed to produce a magnetic coating composition. The viscosity of the magnetic coating composition was adjusted and, thereafter, it was coated on a polyethylene terephthalate support and dried to obtain a magnetic layer having a dry thickness of 5.5 μm.

| | Amount (parts) |
|---|---|
| Carbon black (Raven MTP; average particle size: 250 mμ) | 165 |
| Polyurethane resin ("Nipporan N2304" a trade name, produced by Nippon Polyurethane Co., Ltd.) | 80 |
| Saran resin (a trade name of a polyvinylidene chloride type resin, produced by Dow Chemical Co.) | 30 |
| Copper oleate | 0.5 |
| Methyl ethyl ketone | 450 |
| Cyclohexanone | 50 |

The above ingredients were kneaded and dispersed in a ball mill, and then 30 parts of Desmodur L-75 (polyisocyanate produced by Bayer AG) was added thereto and uniformly dispersed. The thus-prepared dispersion was adjusted in viscosity and coated in a dry thickness of 2 μm (hereinafter the thickness means a dry thickness) on the opposite side of the polyeter support in relation to the magnetic layer to produce a backing layer.

The thus-produced tape was subjected to the calendering treatment for planishing the surface thereof and then slit into a 1 inch width to obtain Sample No. 1.

EXAMPLE 2

Sample No. 2 was produced in the same manner as in Example 1 except that the thickness of the backing layer was changed to 1.5 μm.

EXAMPLE 3

Sample No. 3 was produced in the same manner as in Example 1 except that the thickness of the backing layer was changed to 2.5 μm.

EXAMPLE 4

Sample No. 4 was produced in the same manner as in Example 1 except that the carbon black in the backing layer was replaced with a carbon black having an average particle size of 400 mμ, which had been prepared by dispersing Raven MTP in cyclohexanol and then repeating five times its centrifugal separation at 3,500 rpm.

COMPARATIVE EXAMPLE 1

Sample No. 5 was produced in the same manner as in Example 1 except that Nipporan N2304 in the backing layer was replaced with Pandex T5070 (THF solvent; 100% modulus; 200 kg/cm$^2$ or more).

COMPARATIVE EXAMPLE 2

Sample No. 6 was produced in the same manner as in Example 1 except that Nipporan N2304 in the backing layer was replaced with nitrocellulose (degree of nitration: 11.1%; molecular weight: 50,000; 100% modulus: 200 kg/cm² or more).

COMPARATIVE EXAMPLE 3

Sample No. 7 was produced in the same manner as in Example 1 except that the thickness of the backing layer was changed to 1.0 μm.

COMPARATIVE EXAMPLE 4

Sample No. 8 was produced in the same manner as in Example 1 except that the thickness of the backing layer was changed to 3.0 μm.

EXAMPLE 5

Sample No. 9 was produced in the same manner as in Example 1 except that the amount of Desmodur L-75 used in the backing layer was changed from 30 parts to 15 parts.

EXAMPLE 6

Sample No. 10 was produced in the same manner as in Example 1 except that the amount of Desmodur L-75 used in the backing layer was changed from 30 parts to 50 parts.

COMPARATIVE EXAMPLE 5

Sample No. 11 was produced in the same manner as in Example 1 except that the amounts of Desmodur L-75, Nipporan N2302, and Saran resin used in the backing layer were changed to 90 parts, 240 parts, and 120 parts, respectively.

COMPARATIVE EXAMPLE 6

Sample No. 12 was produced in the same manner as in Example 1 except that the amounts of Desmodur L-75, Nipporan N2304, and Saran resin used in the backing layer were changed to 7.5 parts, 20 parts, and 7.5 parts, respectively.

The degree of peeling of the above Sample Nos. 1 to 12 were measured as adhesion strength using "Cellotape" (a trade name of a cellophane adhesive tape, manufactured by Nichiban Co., Ltd.), scratches of the backing layer, and number of drop outs after 250 passes repeated running. The results are shown in Table 1.

Scratches of the Backing Layer

The tapes having 5 minutes length were subjected to 250 passes (play then rewind) running on the deck, and then the scratches formed in the backing layer were determined with the naked eye, and evaluated based on the following three grade.

A: no scratch was formed.
B: 1 to 5 of scratches were formed.
C: 6 or more of scratches were formed.

Number of Drop Outs

After 250 passes repeated running, the number of drop outs was determined. The number of drop outs was measured with a drop-out counter (Drop Out Counter Model VD-3, produced by Victor Company of Japan Ltd.) The number of drop outs occuring in 5 minutes wherein the reproduction output dropped by more than 16 dB for 15 μsec or more are listed below.

Degree of Peeling

"Cellotape" (17.5 mm × 10 cm) (produced by Nichiban Co., Ltd.) was stuck to the backing layer and peeled off in 180° direction to the backing layer under a load of 1 kg. The ratio of the surface area of the backing layer remaining on the support to the total surface area was used to indicate the adhesion strength of the backing layer with the support.

The degree of peeling of the backing layer evaluated based on following three grades.

A: about 0 to 40% of the backing layer peeling apart.
B: about 41 to 80% of the backing layer peeling apart.
C: about 81 to 100% of the backing layer peeling apart.

TABLE 1

| Sample No. | Carbon Black Type | Carbon Black Particle Size (mμ) | Thickness (μm) | Main Binder | Isocyanate (%) | P/B | Degree of Peeling Evaluation | Degree of Peeling (%) | Scratch | Numer of Drop-Outs |
|---|---|---|---|---|---|---|---|---|---|---|
| 1* | Raven MTP | 250 | 2 | N2304 | 21 | 118/100 | A | 0 | A | 32 |
| 2* | " | " | 1.5 | " | " | " | A | 0 | A | 24 |
| 3* | " | " | 2.5 | " | " | " | B | 20 | A | 32 |
| 4* | " | 400 | 2 | " | " | " | A | 0 | A | 30 |
| 5** | " | 250 | " | T5070 | " | " | B | 20 | C | 1,000 |
| 6** | " | " | " | Nitro-cellulose | " | " | C | 100 | B | 1,000 |
| 7** | " | " | 1 | N2304 | " | " | A | 0 | C | 120 |
| 8** | " | " | 3 | " | " | " | C | 100 | A | 65 |
| 9* | " | " | " | " | 12 | 132/100 | B | 50 | B | 68 |
| 10* | " | " | " | " | 32 | 103/100 | A | 0 | A | 21 |
| 11** | " | " | " | " | 21 | 350/100 | A | 0 | C | 420 |
| 12** | " | " | " | " | " | 30/100 | C | 100 | B | 130 |

Note:
P/B = nonmagnetic powder/all binders
*Example of the present invention
**Comparative Example It can be seen from the above results that if the main binder and the carbon black as defined in the present invention are used and, furthermore, the thickness of the backing layer is within the range of from 1.5 to 2.5 μm, the magnetic recording medium is excellent in all respects including adhesion strength of the backing layer to the support, scratching and drop out. If the amount of the isocyanate used is decreased, the adhesive properties of the backing lsyer are somewhat reduced. Thus when the isocyanate is used in the binder, it is preferred for the isocyanate to be used in an amount of at least 20%.

EXAMPLE 7 AND COMPARATIVE EXAMPLE 7

| | Amount (parts) |
|---|---|
| Co-Containing γ-Fe₂O₃ powder (specific surface area as determined | 300 |

-continued

| | Amount (parts) |
|---|---|
| by the nitrogen absorption method: 30 m²/g; powder Hc: 800) | |
| Vinyl chloride-vinyl acetate-vinyl alcohol (87:5:8 by weight) terpolymer (degree of polymerization: about 400) | 30 |
| Epoxy resin (epoxy group content: 0.56 g equivalent epoxy group/100 g resin) | 15 |
| $Cr_2O_3$ | 15 |
| Carbon black (average particle size: 90 mµ) | 5 |
| Lecithin | 3 |
| Oleyl sarcosine (produced by Nippon Oil and Fats Co., Ltd.) | 1 |
| Octyl laurate | 3 |
| Lauric acid | 4.5 |
| Butyl acetate | 330 |
| Methyl isobutyl ketone | 660 |

The above ingredients were placed into a ball mill and thoroughly kneaded and, thereafter, 20 parts of Desmodur L-75 (a trade name of a polyisocyanate compound produced by Bayer AG) was added and uniformly dispersed to produce a magnetic coating composition. The visocosity of the magnetic coating composition was adjusted and, thereafter, it was coated on the surface of a polyethylene terephthalate support and dried to obtain a magnetic layer having a dry thickness of 5.5 µm.

| | Amount (parts) |
|---|---|
| Carbon black (Raven MTP; average particle size: 250 mµ) | 110 |
| $Cr_2O_3$ (average particle size: 0.7 µm) | 1 |
| Polyurethane ("Nipporan N2304" a trade name, produced by Nippon Polyurethane Co., Ltd.) | 80 |
| Saran Resin (a trade name of a polyvinylidene chloride type resin, produced by Dow Chemical Co.) | 30 |
| Copper oleate | 1 |
| Stearic acid | 0.5 |
| Methyl ethyl ketone | 450 |
| Cyclohexanone | 50 |

The above ingredients were placed into a ball mill and kneaded. Then, 40 parts of Desmodur L-75 (produced by Bayer AG) was added and uniformly dispersed to produce a coating dispersion. The viscosity of the coating dispersion was adjusted and it was coated on the opposite side of the polyester support in relation to the magnetic layer to produce a backing layer in a thickness of 1, 2, 3, or 3.5 µm.

The tape thus produced was subjected to the calendering treatment for planishing the surface thereof and slit into a 1 inch width. The samples having the backing layers thereof having thicknesses of 1.0, 2.0, 2.5, and 3.5 µm were referred to as Samples Nos. 13, 14, 15, and 16, respectively. Samples Nos. 13 and 16 are the Comparative Examples.

COMPARATIVE EXAMPLE 8

Four samples were produced in the same manner as in Example 7 except that, as the Co-containing γ-Fe₂O₃ powder in the magnetic layer, a powder having a specific surface area of 24 m²/g was used. The samples having the backing layers having thicknesses of 1.0, 2,0, 2.5, and 3.5 µm were referred to as Samples Nos. 17, 18, 19, and 20, respectively.

These samples were measured for the RF output, scratches of the backing layer, and number of drop outs after 500 passes repeated running. The results are shown in Table 2.

The RF output and scratches of the backing layer were measured in the same manner and the same evaluation as in Examples 1 to 6. In connection with the drop out, a drop out counter (Drop Out Counter Model VD-3, produced by Victor Company Japan Ltd.) was used and the number of cases in which the reproduction output level dropped by 16 dB or more during a period of 15 µsec or more was indicated as a total number for a 5 minute period.

TABLE 2

| Sample No. | Magnetic Material | Thickness (µm) | RF Output (dB) | Scratches | Number of Drop-Outs |
|---|---|---|---|---|---|
| 13* | Co-containing γ-iron oxide (specific surface area: 30 m²/g) | 1.0 | 0 (standard) | C | 240 |
| 14** | Co-containing γ-iron oxide (specific surface area: 30 m²/g) | 2.0 | 0 | A | 26 |
| 15** | Co-containing γ-iron oxide (specific surface area: 30 m²/g) | 2.5 | −0.4 | A | 25 |
| 16* | Co-containing γ-iron oxide (specific surface area: 30 m²/g) | 3.5 | −1.3 | A | 25 |
| 17* | Co-containing γ-iron oxide (specific surface area: 24 m²/g) | 1.0 | −3.8 | C | 160 |
| 18* | Co-containing γ-iron oxide (specific surface area: 24 m²/g) | 2.0 | −3.8 | A | 18 |
| 19* | Co-containing γ-iron oxide (specific surface area: 24 m²/g) | 2.5 | −4.0 | A | 15 |
| 20* | Co-containing γ-iron oxide (specific surface area: | 3.5 | −4.2 | A | 16 |

TABLE 2-continued

| Sample No. | Magnetic Material | Thickness (μm) | RF Output (dB) | Scratches | Number of Drop-Outs |
|---|---|---|---|---|---|
| | 24 m²/g) | | | | |

Note:
*Comparative Example
**Example of the present invention

It can be seen from the above results that the RF output, when the specific surface area of the ferromagnetic powder is 30 m²/g, is superior to that, when the specific surface area is 24 m²/g (comparative example). In addition, it can be seen that even when the specific surface area of the ferromagnetic powder is 30 m²/g, if the thickness of the backing layer is 1.0 μm and 3.5 μm, the tape is disadvantageous in the formation of scratches or RF output.

EXAMPLE 8

A polyethylene terephthalate support was coated with the same magnetic layer as in Example 1 except that 10 parts of α-alumina was omitted.

| | Amount (parts) |
|---|---|
| Carbon black ("Sevalco MICI", a trade name, produced by Sevalco Co., Ltd., average particle size: 250 mμ) | 200 |
| Polyurethane resin ("Nipporan N2304" a trade name, produced by Nippon Polyurethane Co., Ltd.) | 80 |
| Phenoxy resin ("PKHH", a trade name, produced by Union Carbide Co.) | 35 |
| Copper oleate | 1 |
| Methyl ethyl ketone | 450 |
| Cyclohexanone | 50 |

The above ingredients were kneaded in a ball mill, and 30 parts of Caronate L (polyisocyanate produced by Nippon Polyurethane Co., Ltd.) was added and uniformly dispersed. The thus-obtained dispersion was coated in a thickness of 2 μm to produce a backing layer on the opposite side of the polyester support in relation to the magnetic layer.

The thus-produced tape was subjected to a calendering treatment for planishing the surface thereof and then slit into a 1 inch width to produce Sample No. 21.

EXAMPLE 9

Sample No. 22 was produced in the same manner as in Example 8 except that the thickness of the backing layer was changed to 1.5 μm.

EXAMPLE 10

Sample No. 23 was produced in the same manner as in Example 8 except that the thickness of the backing layer was changed to 2.5 μm.

EXAMPLE 11

The coloring components of Raven MTP was removed with benzene and the solvent was distilled away therefrom. Thereafter, in the same manner as in Example 8, Sample No. 24 was produced except the carbon black derived from Raven MTP as described above was used instead of the carbon black of Example 8.

COMPARATIVE EXAMPLE 9

Sample No. 25 was produced in the same manner as in Example 8 except that Nipporan N2304 was replaced with Pandex T5070 (THF solvent; 100% modulus: more than 200 kg/cm²).

COMPARATIVE EXAMPLE 10

Sample No. 26 was produced in the same manner as in Example 8 except that Nipporan N2304 was replaced with nitrocellulose (degree of nitration: 11.1%; molecular weight: 500,000; 100% modulus: 200 kg/cm² or more).

COMPARATIVE EXAMPLE 11

Sample No. 27 was produced in the same manner as in Example 8 except that the thickness of the back layer was changed to 3.0 μm.

COMPARATIVE EXAMPLE 12

Three samples were produced in the same manner as in Example 8 except that, as the carbon black of the backing layer, 200 parts of Raven MTP was used and the thickness of the backing layer was changed to 1.0, 2.0 or 3.0 μm. The samples having the backing layers having thicknesses of 1.0, 2.0 and 3.0 μm were referred to as Samples Nos. 28, 29 and 30, respectively.

The above tapes of Samples Nos. 21 to 30 were measured for the contamination of the backing layer, the formation of scratches on the backing layer, and the number of drop outs after 500 passes repeated running. The results are shown in Table 3.

Contamination of the Backing Layer

During the tape-feeding process, a paper towel was wound on the tape guide of the deck, in order to determine the bleeding of the oil and staining of the backing layer, and evaluated by the contamination of the paper towel based on the following three grades.

A: no contamination.
B: somewhat contaminated.
C: seriously contaminated.

Scratches of the Backing Layer

The tapes having 5 minutes length were subjected to 500 passes (play then rewind) repeated running on the deck, and then the formation of scratches in the backing layer were determined with the naked eye, and evaluated based on the following three grades.

A: no scratch was formed.
B: 1 to 5 of scratches were formed.
C: 6 or more of scratches were formed.

Number of Drop Outs

After 500 passes repeated running, the number of cases (per 5 minutes) that the reproduction output level dropped by 16 dB or more for 15 μsec or more was measured with a drop out counter (Drop Out Counter Model VD-3, produced by Victor Company Japan Ltd.).

TABLE 3

| Sample No. | Carbon | Transmittance° (%) | Thickness of the Backing Layer (μm) | Contamination of Paper Towel | Scratches | Number of Drop Outs |
|---|---|---|---|---|---|---|
| 21* | Sevalco MTCI | 100 | 2.0 | A | A | 20 |
| 22* | " | " | 1.5 | A | A | 21 |
| 23* | " | " | 2.5 | A | A | 20 |
| 24* | Raven MTP | 90 | 2.0 | A | A | 23 |
| 25*° | Sevalco MTCI | 100 | 2.0 | A | C | >1,000 |
| 26*° | " | " | 2.0 | A | B | >1,000 |
| 27** | " | " | 3.0 | A | A | 20 |
| 28** | Raven MTP | 4.4 | 1.0 | C | C | 180 |
| 29** | " | " | 2.0 | C | A | 67 |
| 30** | " | " | 3.0 | C | A | 43 |

Note:
*Example of the present invention
**Comparative Examples
°Transmittance at 420 nm as determined according to JIS.
°°the binder was changed.

It can be seen from the above results that if the carbon black having a color transmittance in benzene of 50% or more is used, the magnetic recording medium is particularly excellent in the number of drop outs and contamination of the back layer.

Thus the present invention provides a magnetic recording medium in which the drop outs is reduced, the RF output, the signal/noise ratio, the sensitivity, and the running properties of the back layer are excelent and the peeling off thereof does not occur.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer on one side and a backing layer on the other side, wherein the backing layer contains (1) non-magnetic powders containing carbon black having an average particle diameter of from 0.15 to 1.0 μm; (2) two or more binders wherein (a) at least one of the binders is a resin having a 100% modulus of from 15 to 150 kg/cm² in an amount of from 50 to 95 wt% based on the total amount of the binders in the backing layer, and (b) the remaining binder is, or if more than one remaining binder is present, the remaining binders are a resin other than the resin having a 100% modulus of from 15 to 150 kg/cm², and the weight ratio of all the non-magnetic powders to all the binders in the backing layer is from 300:100 to 40:100; and (3) a polyisocyanate in an amount of from 15 to 40 wt% based on the total amount of the binders in the backing layer.

2. The magnetic recording medium as claimed in claim 1, wherein the amount of the carbon black having an average particle diameter of from 0.15 to 1.0 μm is at least 50 wt% based on the total amount of the non-magnetic powders in the backing layer.

3. The magnetic recording medium as claimed in claim 1, wherein the resin having a 100% modulus of from 15 to 150 kg/cm² is a polyurethane resin.

4. The magnetic recording medium as claimed in claim 1, wherein the amount of the polyisocyanate is in the range of from 15 to 30 wt% based on the total amount of the binders.

5. The magnetic recording medium as claimed in claim 1, wherein the magnetic layer contains ferromagnetic fine powder having a specific surface area of from 25 to 70 m²/g and the dry thickness of the backing layer is from 1.5 to 2.5 μm.

6. The magnetic recording medium as claimed in claim 5, wherein the ferromagnetic fine powder has a specific surface area of from 27 to 70 m²/g.

7. The magnetic recording medium as claimed in claim 6, wherein the ferromagnetic fine powder has a specific surface area of from 30 to 70 m²/g.

8. The magnetic recording medium as claimed in claim 1, wherein the color transmittance in benzene of the carbon black in the backing layer is at least 50%.

9. The magnetic recording medium as claimed in claim 1, wherein the carbon black has a specific surface area of 25 m²/g or less.

10. The magnetic recording medium as claimed in claim 1, wherein the carbon black has an average particle diameter of from 0.15 to 0.5 μm.

11. The magnetic recording medium as claimed in claim 1, wherein the resin of binder (2)(a) is a resin having a 100% modulus of from 15 to 120 kg/cm².

12. The magnetic recording medium as claimed in claim 1, wherein the resin of binder (2)(a) has a softening temperature of 150° C. or less, an average molecular weight of about 10,000 to about 200,000 and a degree of polymerization of from about 200 to about 500.

13. The magnetic recording medium as claimed in claim 12, wherein a resin used in the backing layer other than the resin having a 100% modulus of from 15 to 150 kg/cm² is selected from the group consisting of a vinyl chloride resin, a vinyl acetate resin, a acrylonitrile resin and cellulose derivatives.

14. The magnetic recording medium as claimed in claim 1, wherein the dry thickness of the backing layer is from 1.5 to 2.5 μm.

15. The magnetic recording medium as claimed in claim 1 in the form of a magnetic recording tape.

16. The magnetic recording medium as claimed in claim 15, wherein the non-magnetic support has a thickness of from 2.5 to 100 μm.

17. The magnetic recording medium as claimed in claim 16, wherein the non-magnetic support has a thickness of from 3 to 40 μm.

18. The magnetic recording medium as claimed in claim 1, wherein the non-magnetic particles in the backing layer other than the carbon black have an average particle diameter of from 0.01 to 3 μm.

19. The magnetic recording medium as claimed in claim 18, wherein the non-magnetic particles in the backing layer other than the carbon black have an average particle diameter of from 0.01 to 1 μm.

20. The magnetic recording medium as claimed in claim 1, wherein the weight ratio of the non-magnetic powder to all of the binders in the backing layer is from 200:100 to 50:100.

21. The magnetic recording medium as claimed in claim 20, wherein the weight ratio of the non-magnetic powder to all of the binders in the backing layer is from 200:100 to 75:100.

22. The magnetic recording medium as claimed in claim 1, wherein the amount of the polyisocyanate is in the range of from 15 to 30 wt% based on the total amount of the binders in the backing layer.

* * * * *